(12) United States Patent
Tolhuizen et al.

(10) Patent No.: US 10,230,265 B2
(45) Date of Patent: Mar. 12, 2019

(54) AUTOMATIC POWER LEVEL TRIMMING VIA BROADCAST MEDIUM

(71) Applicant: PHILIPS LIGHTING HOLDING B.V., Eindhoven (NL)

(72) Inventors: Ludovicus Marinus Gerardus Maria Tolhuizen, Waalre (NL); Sri Andari Husen, Eindhoven (NL); Oliver Schreyer, Herzogenrath (DE); Meng Zhao, Eindhoven (NL); Emmanuel David Lucas Michael Frimout, Nuenen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 565 days.

(21) Appl. No.: 14/429,851

(22) PCT Filed: Aug. 30, 2013

(86) PCT No.: PCT/IB2013/058146
§ 371 (c)(1),
(2) Date: Mar. 20, 2015

(87) PCT Pub. No.: WO2014/045143
PCT Pub. Date: Mar. 27, 2014

(65) Prior Publication Data
US 2015/0214786 A1    Jul. 30, 2015

Related U.S. Application Data

(60) Provisional application No. 61/704,358, filed on Sep. 21, 2012.

(51) Int. Cl.
*H02J 3/00* (2006.01)
*H02J 3/12* (2006.01)
(Continued)

(52) U.S. Cl.
CPC .......... *H02J 13/0006* (2013.01); *H02J 3/005* (2013.01); *H02J 3/12* (2013.01); *H02J 3/14* (2013.01);
(Continued)

(58) Field of Classification Search
CPC .......... H02J 3/14; H02J 13/0006; H02J 3/005; H02J 13/0017; H02J 13/0062
(Continued)

(56) References Cited

U.S. PATENT DOCUMENTS

| | | |
|---|---|---|
| 4,247,786 A | 1/1981 | Hedges |
| 4,694,192 A | 9/1987 | Payne et al. |

(Continued)

FOREIGN PATENT DOCUMENTS

DE    102007016635 A1    10/2008

OTHER PUBLICATIONS

"Airwave Wireless Controls", Product Manual, Version 3, #L0337, Philips Ledalite, 2011, pp. 1-38.
(Continued)

*Primary Examiner* — Lincoln D Donovan
*Assistant Examiner* — Diana J. Cheng
(74) *Attorney, Agent, or Firm* — Meenakshy Chakravorty

(57) ABSTRACT

The present invention relates to a method and apparatus for controlling power distribution by a control system that only requires a broadcast medium between a controller (30) and appliances or loads (20-1 to 20-n) and information about the current total power consumption of the system to precisely reach a target consumption level in a stepwise, fast converging way without "seesaw" effects and with "fair distribution" of any power reduction.

20 Claims, 3 Drawing Sheets

(51) Int. Cl.
   *H02J 3/14* (2006.01)
   *H02J 13/00* (2006.01)
(52) U.S. Cl.
   CPC ....... *H02J 13/0075* (2013.01); *H02J 13/0079* (2013.01); *H02J 2003/143* (2013.01); *Y02B 70/3225* (2013.01); *Y02B 70/3266* (2013.01); *Y02B 90/2653* (2013.01); *Y04S 20/222* (2013.01); *Y04S 20/242* (2013.01); *Y04S 40/126* (2013.01); *Y10T 307/406* (2015.04)
(58) Field of Classification Search
   USPC .................................................... 307/11–44
   See application file for complete search history.

(56) References Cited

U.S. PATENT DOCUMENTS

| | | | |
|---|---|---|---|
| 4,810,946 | A | 3/1989 | Sweeney, Jr. |
| 6,528,957 | B1 | 3/2003 | Lluchaco |
| 6,671,586 | B2 | 12/2003 | Davis et al. |
| 2005/0207081 | A1 | 9/2005 | Ying |
| 2006/0259199 | A1 | 11/2006 | Gjerde et al. |
| 2008/0088180 | A1 | 4/2008 | Cash et al. |
| 2009/0216387 | A1 | 8/2009 | Klein |
| 2010/0117620 | A1 | 5/2010 | Veskovic et al. |
| 2012/0001487 | A1 | 1/2012 | Pessina |

OTHER PUBLICATIONS

Lefurgy, Charles, et al., "Power Capping: A Prelude to Power Shifting," Cluster Comput, 2008, (11 Pages).

International Standard, Digital Addressable Lighting Interface—Part 102: General Requirements—Control Gear, IEC 62386-102, 2009 (284 Pages).

Karl Johan Astrom, et al., "Feedback Systems, An Introduction for Scientists and Engineers," Version V2.11B, Sep. 2012 (406 Pages).

Frank L. Lewis, et al., "Automation and Control Engineering, A Series of Reference Books and Textbooks," Quantitative Process Control Theory, 2012 (470 Pages).

AUTOMATIC POWER LEVEL TRIMMING VIA BROADCAST MEDIUM

CROSS-REFERENCE TO PRIOR APPLICATIONS

This application is the U.S. National Phase application under 35 U.S.C. § 371 of International Application No. PCT/IB13/058146, filed on Aug. 30, 2013, which claims the benefit of U.S. Provisional Patent Application No. 61/704,358, filed on Sep. 21, 2012. These applications are hereby incorporated by reference herein.

FIELD OF THE INVENTION

The invention relates to the field of apparatuses for controlling power supply via a network connection (e.g. Ethernet connection). Furthermore, the invention relates to a power controller device, and a system comprising the power controller device, a oplurality of load devices and a communication medium. The invention further relates to a corresponding method and a corresponding computer program.

BACKGROUND OF THE INVENTION

In an electricity grid, demand response refers to managing the demand side (customer domain) in response to supply conditions, in particular in periods of peak demand. Load shedding is a type of demand response application to temporarily and on demand reduce the power consumption of electric appliances (i.e. loads). Typical examples are dimming of lights, decreasing setpoints of HVAC (heating, ventilation, and air conditioning), or using energy saving modes of consumer electronics equipment. Thus, load shedding is what electric utilities want their customers to do when there is a huge demand for electricity that exceeds the generation available.

Demand response can be realized simply via manual control of appliances, but centralized control (from a management station) has obvious advantages. For central control, communication between a central controller (e.g. building management station) and the appliances is required.

Demand response can be done in a "best effort" manner, but there may also be conditions requiring very precise reduction. Such conditions can be the contract between the demand response provider (the customer) and the receiver (e.g. a utility), or just the goal to limit the reduction to "what is required", e.g. because the related decrease of user comfort (e.g. by dimming) shall be minimized. Precise consumption reduction can be achieved if exact operation status information of the appliances is available and/or the appliances can be individually controlled by the central controller hosting related programs to determine the required command parameters. This is, however, the ideal case. Many control systems lack at least parts of these fine-grained capabilities. Typical restrictions are unknown status of individual appliances, i.e., the complete system appears as "black box", or no individual addressing of appliances, i.e. all appliances receive the same command.

Conventional solutions for such restricted systems include uniform shedding or stepwise shedding to pre-programmed levels (via a broadcast command) as described for lighting loads in the US2010/0117620A1, measuring the effect of the shed, i.e. the system consumption after the shed command, shed to the next level if consumption reduction is (still) insufficient, and when a consumption level below the target is reached, but it shall be closer to the target, the consumption level may be increased again, e.g. to a level halfway the last two sheds.

However, in a restricted system as described above, "overshooting" may occur when the system reduces the system power consumption more than required, which may lead to undesired effects (e.g. in case of dimming lights) where user comfort is more decreased than necessary. Moreover, a so-called "see-saw" effect may occur if target consumption is achieved by reduction and increase of consumption in one procedure, this may affect user comfort significantly (e.g. in case of dimming lights). In addition, "unfair distribution" may be faced. Looking at relative power levels (i.e. relative to the maximal consumption of an appliance), it is unfair to equally distribute the load change over all appliances. Loads that are already at a low consumption level will still have to shed further. In such cases, it may be desirable to first reduce the loads at high consumption levels.

SUMMARY OF THE INVENTION

It is an object of the invention to provide power control with fast, user-friendly, and precise power consumption adaptation in a restricted system.

This object is achieved by an apparatus as claimed in claim 1, by a power controller device as claimed in claim 7, by a system as claimed in claim 8, by a method as claimed in claim 9, and by a computer program product as claimed in claim 15.

Accordingly, an automatic load shedding method for a control system is proposed that only requires a broadcast medium between power controller device and load devices (e.g. appliances) and information about the current total power consumption of the system (i.e. all load devices) to precisely (in the sense of coming close to target in whatever precision is required) reach a target consumption level in a stepwise, fast converging way without "see-saw" effects and with "fair distribution" (in the sense that loads at highest consumption levels are reduced first).

Knowing current and target power consumption, the power controller device broadcasts a "trim" command containing a power change information (e.g. a percentage (or analogous) value or ratio or (coded) level or the like) to all load devices. On reception of the power trim command, the load device goes to the power level that equals the minimum of its desired power level, e.g one that was set up by an end user, and its maximum power consumption reduced according to the power change information. The above reaction on reception of a trim level command is for example described in IEC62386-102, Digital addessable lighting interface—Part 102: General requirements control gear. Page 19-20, Section 9.4.

The power controller device may repeat the "trim step" until the current consumption is close enough to the target consumption or target value (fulfilling whatever precision is required). The power controller device may calculate the trim values in a way that the total power consumption level converges fast and in one direction (always decreasing) towards the target level, The power controller device may alternatively calculate the power trim commands in a way that the total power consumption level goes immediately below the target value in an initial step and afterwards converges fast and in one direction (always increasing) towards the target level.

If the total power consumption shall be further reduced on a subsequent request, the stepwise procedure can be applied again.

The proposed solution also allows for a request to relax the consumption reduction after a power trim command, i.e. to go to or set a power consumption level higher than the current (trimmed) power consumption level.

According to the definitions, the "desired power consumption level" (i.e., the sum of the desired power levels of all load devices) provides a predetermined level (e.g., an upper bound) for the system power consumption. According to the proposed solution, the power controller device does not need to know the "desired power consumption level" to properly handle requests The power controller device can recognize that the system reaches the desired power consumption level (and e.g. stop a sequence of trim steps in this case) by detecting that consecutive steps led to the same total power consumption of the system. Optionally, the power controller device may check if the total power consumption is close enough to the target value to fulfill a predetermined precision requirement. As another option, the power controller device may restrict the amount of change of the power change information between two successive steps to a predetermined threshold value.

It is noted that the above apparatuses of the power controller device and the load devices, respectively, may be implemented as discrete hardware circuits or integrated circuits or multiple chips or chipsets, or as software routines for controlling a processor to perform their above functions or functionalities.

It shall be understood that the substance determining apparatus of claim 1, the power controller device of claim 7, the systems of claim 8, the method of claim 9, and the computer program product of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Embodiments are now described based on a system for controlling power consumption of a plurality of appliances or other load devices via a communication medium that allows broadcasting power trim commands to each appliance.

Figure 1:
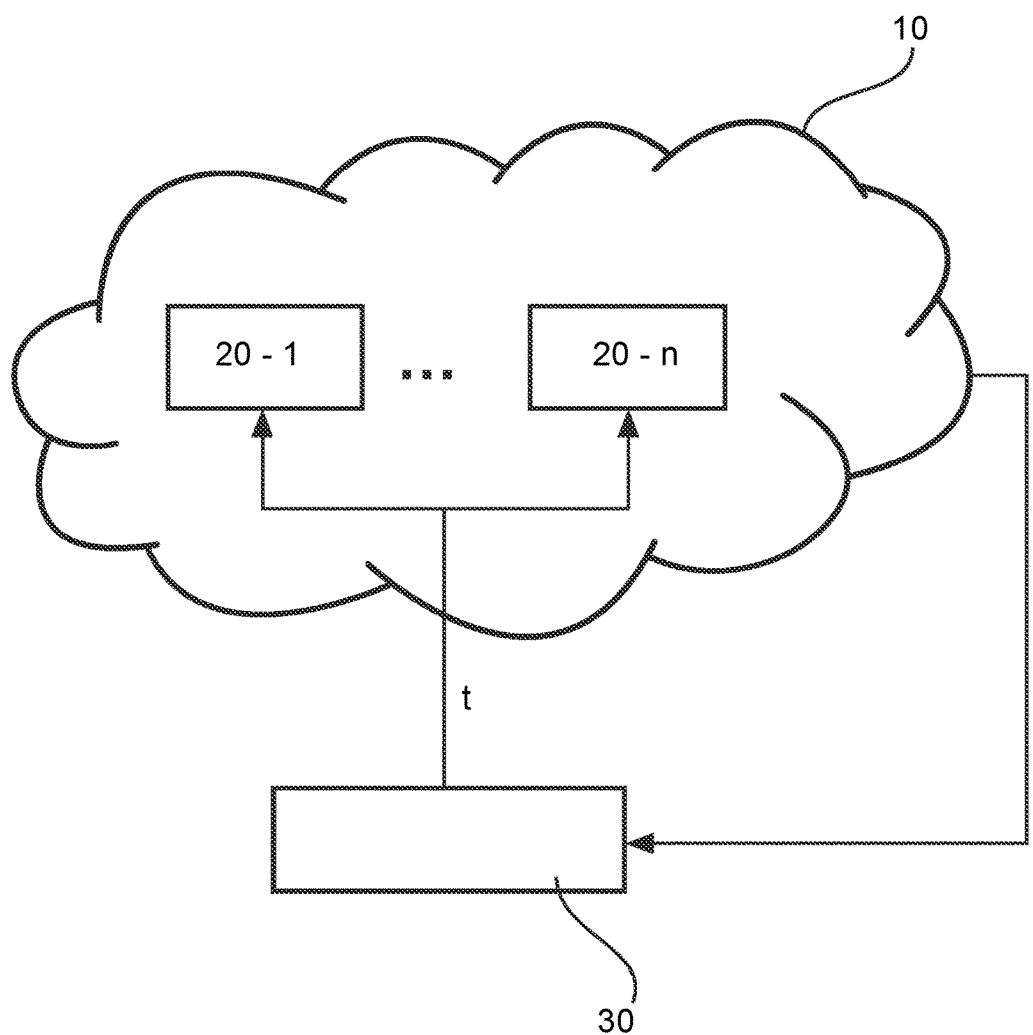
FIG. 1 shows a schematic block diagram of a system architecture according to various embodiments.

FIG. 1 shows a schematic block diagram of a network architecture of a power control system in which the following embodiments can be implemented. The system comprises a controller 30, a plurality of appliances 20-1 to 20-n and a communication medium or network 10 connecting the controller 30 and the appliances 20-1 to 20-n in a way that the controller can broadcast power trim commands t containing a power change information (e.g. percentage, ratio or (coded) level) to all appliances 20-1 to 20-n. Furthermore, the controller 30 is capable of determining the current total power consumption of the system (i.e. of all appliances), e.g., based on a connection to a related power meter or an access to related power information (indicated by the feedback arrow from the communication network 10 to the controller 30). Hence, the controller 30 has knowledge about or can determine a current (total) power consumption value of the system.

For power control purposes the controller 30 broadcasts a power trim command t containing the percentage value (or other kind of power change information, such as ratio or level or the like) to all appliances 20-1 to 20-n. Each appliance 20-1 to 20-n maintains a "desired power consumption level" (e.g. one that was setup by the end-user), and on reception of the trim command, the appliance goes to or sets the power level that equals the minimum of its desired power level and the product of said percentage value (of the trim command) with the maximum power consumption of the appliance.

The below embodiments of the present invention aim to allow a change from a current power consumption of the system to a target power consumption in a way that the system consumption converges fast and in "one direction" to the target level with "fair distribution" and without "see-saw" effects as defined above.

In the following, more detailed implementations of the controller 30 and the appliances 20-1 to 20-n or other load devices of the proposed system according to first to fourth embodiments are described based on FIGS. 2 and 3.

Figure 2:
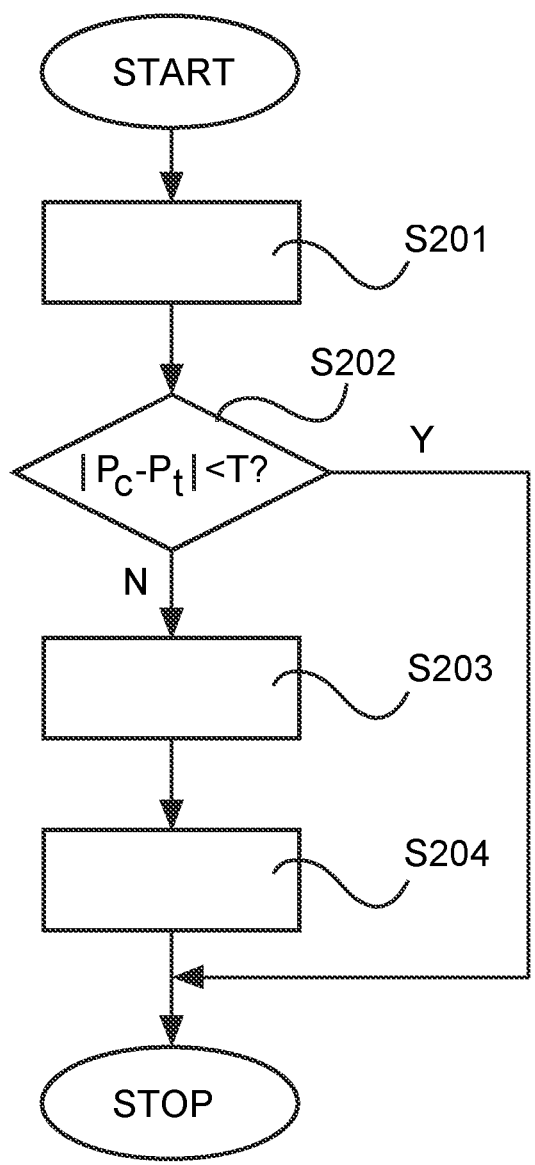
FIG. 2 shows a flow diagram of a power level control procedure according to a predetermined Procedure 1 used in various embodiments.

FIG. 2 shows flow diagram of a power control procedure which is called Procedure 1 in the following. It is adapted to bring a system with a current system power consumption Pc, and a target system power consumption Pt (which the system is requested to go to) to a new system power consumption Pn in the following way:

It is assumed that the controller 30 knows the values of Pc and Pt and a value Pb which is larger than or equal to the sum of the maximum power consumption of all lamps in the system. In step S201, the controller 30 determines the "current trim value" tc, which corresponds to the last trim value applied to the system or to the value "1" in case of an untrimmed system, and it determines the current system power consumption Pc. In step S202 the controller checks if the current power consumption Pc is close enough to the target consumption (defined e.g. by a threshold value T, such that the precision requirement is fulfilled |Pc−Pt|<T). If that is the case, the procedure stops. If not, then, in step S203, the controller 30 calculates a "new trim level" tn by tn=tc−(Pc−Pt)/Pb. In the following step S204, the controller 30 broadcasts a trim command with the "new trim level" tn to all appliances 20-1 to 20-n.

The appliances react on the trim command in the defined way which results in a new system power consumption Pn. As already mentioned, steps S201 to S203 are referred to as Procedure 1. Procedure 1 is employed in the following two embodiments, in which the following two cases can be combined or implemented separately: 1) If Pc>Pt: moving down in a monotonic way, and 2) if Pc<Pt moving up in a monotonic way. In the first embodiment, Procedure 1 is employed repeatedly until one or more of the following stopping criteria is satisfied: a) the criterion described in step S202, b) the number of times that Procedure 1 has been employed has reached a certain threshold value, or c) in the two most recent applications of Procedure 1, the resulting system power consumptions were equal but less than the target value Pt.

It can be shown that with the first embodiment, if the initial system power consumption exceeds Pt, then the system power consumption is reduced with every application of Procedure 1, and that without limit on the number of iteration steps, the threshold can be approached up to any desired accuracy. If the initial system power consumption is smaller than Pt, there are two possibilities. Pd denotes the sum of the desired power consumptions of the appliances 20-1 to 20-$n$. If Pd is larger than or equal to Pt, then every iteration increases the system power consumption, and without limit on the number of iterations, the threshold can be approached up to any accuracy. If Pd is smaller than Pt, then every iteration increases the system power consumption until it reaches the value Pd; subsequent iterations do not result in any change in the system power consumption. In the execution of the first embodiment, it need not be known if Pd is smaller than Pt or not; the above stopping criterion c) makes sure that the correct behaviour is achieved in both cases.

In a second embodiment, if the system power consumption Pc exceeds the target system power consumption Pt, the central controller transmits a trim value t=Pt/Pb. The appliances 20-1 to 20-$n$ react on it in the defined manner. Subsequently, the procedure of the first embodiment is applied on this new setting of the system, but without stopping criterion c) in any iteration. The check may however be added optionally.

According to the second embodiment, after transmission of the first trim level value t=Pt/Pb, the system power consumption is smaller than or equal to Pt. After that, the system power consumption increases with every iteration, and with an unlimited number of iterations, Pt can be approached up to any accuracy.

In the following third and fourth embodiments, the controller 30 maintains knowledge about the last two trimming steps for use in a further procedure (called Procedure 2). These embodiments allow for reaching a target level within a given accuracy with fewer iterations than with the first and second embodiment.

Figure 3:
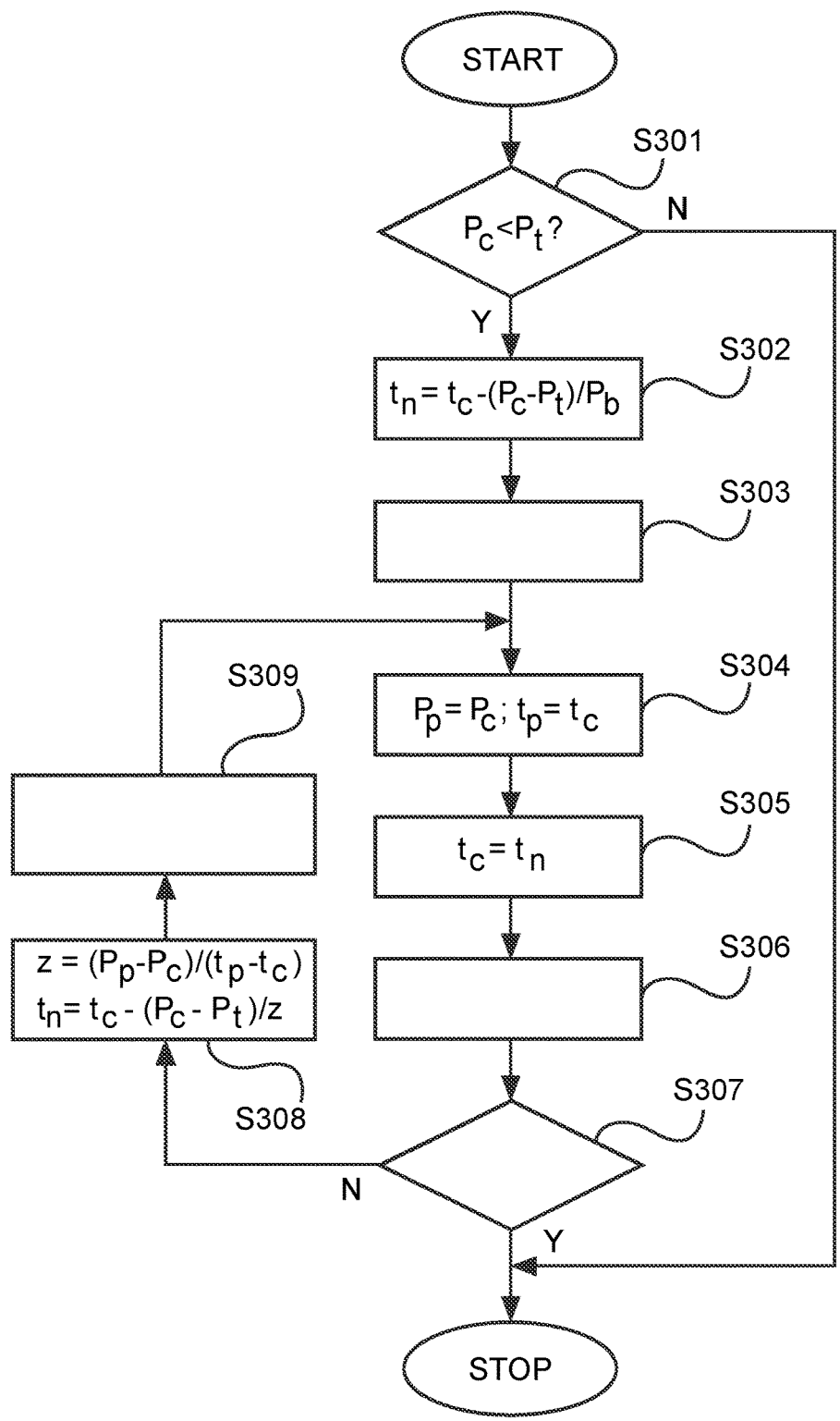
FIG. 3 shows a flow diagram of a power level control procedure according to a third embodiment

FIG. 3 shows a flow diagram of the third embodiment. In step S301, the controller 30 checks if Pc<Pt. If not, the procedure stops. If Pc<Pt, in step S302, the controller 30 computes the new trim level tn=tc−(Pc−Pt)/Pb and broadcasts this new trim level to the appliances 20-1 to 20-$n$. In step S303, the appliances 20-1 to 20-$n$ react in the defined manner. In step S304, the controller 30 sets the value of Pp to Pc, and the value of tp to tc. In step S305, the controller 30 sets the value of tc to tn. In step S306, the controller 30 measures the system power consumption, and sets the value of Pc to said measured system power consumption. In step S307, the controller 30 checks if Pc is close enough to Pt, or if Pp equals Pc. If one or both of this criteria are met, the procedure stops. If none of the stopping criteria are satisfied, in step S308, the controller 30 computes the number z as z=(Pp−Pc)/(tp−tc), and computes the new trim level tn=tc−(Pc−Pt)/z, and broadcasts this new trim level to the appliances 20-1 to 20-$n$. In step S309, the appliances 20-1 to 20-$n$ react in the defined manner. After that, controller 30 returns to step S304.

In order to reduce the number of steps of the procedure in the third embodiment, the above stopping criterion b) can be implemented as follows. In step S302, the controller 30 also sets a counter j to 1. In step S304, the controller 30 also increases said counter j by 1. In step S307, the controller also checks if the value of j is below a certain threshold; if not, the procedure stops.

In a fourth embodiment, the controller 30 first checks if Pc>Pt. If not, the procedure stops. If Pc>Pt, the controller broadcasts the trim level tc=Pt/Pb to the appliances 20-1 to 20-$n$. Next, the appliances react in the defined manner. Subsequently, central controller 30 obtains the total system power consumption Pc. Then steps S302-S309 of the third embodiment are applied.

Large changes in trimming levels may result in light level changes that are annoying to persons. In order to reduce this effect, in each of the above first to fourth embodiments, the computation of a new trim level value tn could be modified in the following way:

Let thrd_up and thrd_down be threshold values. In each step, compute tn as before. If tn>tc+thrd_up, redefine tn as tc+thrd_up. If tn<tc−thrd_down, redefine tn as tc−thrd_down.

Thereby, the change of the trim level value (i.e. power change information) between subsequent trimming steps can be restricted to the above threshold values.

Furthermore, in an alternative software-based implementation, the required functionalities can be implemented in a computer device of the controller 30 with a processing unit which performs control based on software routines of a control program stored in a memory. The control program may also be stored separately on a computer-readable medium. Program code instructions are fetched from the memory and are loaded to the control unit of the processing unit in order to perform the functions of the steps described in connection with FIGS. 2 and 3, which may be implemented as the above mentioned software routines. The processing steps may be performed on the basis of input data and may generate output data. In the present power control mechanism, the input data may correspond to determined power consumption level(s), and the output data may correspond to the trim commands.

Consequently, the functionalities of the above embodiments may be implemented as a computer program product comprising code means for generating each individual step of the proposed channel estimation when run on a computer device or data processor.

To summarize, method and apparatuses have been described for controlling power distribution by a control system that only requires a broadcast medium between a controller and appliances or loads and information about the current total power consumption of the system to precisely reach a target consumption level in a stepwise, fast converging way without "see-saw" effects and with "fair distribution" of any power reduction.

While the invention has been illustrated and described in detail in the drawings and foregoing description, such illustration and description are to be considered illustrative or exemplary and not restrictive; the invention is not limited to the disclosed embodiment. A proposed application of the present invention may be power distribution for smart lighting control systems, building control applications and smart grid building management systems.

Other variations to the disclosed embodiment can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a

The invention claimed is:
1. An apparatus for controlling power supply of a plurality of load devices, said apparatus comprising:
at least one hardware processor configured to:
determine a total power consumption of said plurality of load devices,
calculate a fraction of a difference of the total power consumption and a target value,
generate power change commands with power change information based on said calculated fraction, and at least one of the power change commands comprising a power change that is an alteration of a previous power change by said fraction, the previous power change being of a previous power change command in a stepwise procedure, and
broadcast said power change commands via a communication medium to said plurality of load devices in said stepwise procedure that is converging towards the lower value of said target value and a sum of desired power values of said plurality of load devices.

2. The apparatus according to claim 1, wherein said at least one hardware processors adapted to generate said power change commands so as to reduce said total power consumption from a current value to said target value in a stepwise procedure that moves said total power consumption below said target value in an initial step and that afterwards converges towards said target value in a way that each step leads to a total power consumption that is higher than the total power consumption of the previous step.

3. The apparatus according to claim 1, wherein said at least one hardware processor is adapted to generate said power change commands so as to increase said total power consumption to a higher target value in a stepwise procedure that either is converging towards said higher target value in a way that each step leads to a total power consumption that is higher than the total power consumption of the previous step, or stops if two consecutive steps lead to equal total power consumptions.

4. The apparatus according to claim 1, wherein said at least one hardware processor is adapted to maintain information about said power change information and resulting total power consumption of at least two most recent steps of said stepwise procedure.

5. The apparatus according to claim 1, wherein said at least one hardware processor is adapted to check if said total power consumption is close enough to said target value to fulfill a predetermined precision requirement.

6. The apparatus according to claim 1, wherein said at least one hardware processor is adapted to restrict the amount of change of said power change information between two successive steps to a predetermined threshold value.

7. A power controller device comprising an apparatus according to claim 1.

8. A system comprising:
the apparatus as defined in claim 1; and
the plurality of load devices of claim 1, wherein the plurality of load devices are configured to perform said generated power change commands according to said stepwise procedure by changing power consumption of the load devices in accordance with said generated power change commands.

9. The apparatus according to claim 1, wherein the fraction is based on at least one of a first value that is larger than or equal to a sum of maximum power consumptions of the plurality of load devices or a second value that is based on said power change information and resulting total power consumption of at least two most recent steps of said stepwise procedure.

10. A system comprising:
the apparatus as defined in claim 9; and
the plurality of load devices of claim 9, wherein the plurality of load devices are configured to perform said generated power change commands according to said stepwise procedure by changing power consumption of the load devices in accordance with said generated power change commands.

11. A method of controlling power supply of a plurality of load devices, said method comprising the steps of:
determining a total power consumption of said plurality of load devices;
calculating a fraction of a difference of the total power consumption and a target value,
generating power change commands with power change information based on said fraction, and at least one of the power change commands comprising a power change that is an alteration of a previous power change by said fraction, the previous power change being of a previous power change command in a stepwise procedure; and
broadcasting said power change commands via a communication medium to said plurality of load devices in said stepwise procedure that is converging towards the lower value of said target value and a sum of desired power values of said plurality of load devices.

12. The method of claim 11, wherein said power change commands are generated so as to reduce said total power consumption from a current value to said target value in a stepwise procedure that moves said total power consumption below said target value in an initial step and that afterwards converges towards said target value in a way that each step leads to a total power consumption that is higher than the total power consumption of the previous step.

13. The method according to claim 11, wherein each step of said stepwise procedure leads to a total power consumption that is higher than the total power consumption of the previous step, or stops if two consecutive steps lead to equal total power consumptions.

14. The method according to claim 11, further comprising, in response to the receipt of said power change commands, setting a power consumption level at said plurality of load devices to a value that equals the minimum of a desired power consumption level of said load device and the maximum power consumption level of said load device reduced according to said power change information.

15. The method according to claim 11, further comprising checking if said total power consumption is close enough to said target value to fulfill a predetermined precision requirement.

16. The method according to claim 11, further comprising restricting the amount of change of said power change information between two successive steps to a predetermined threshold value.

17. A non-transitory computer program storage medium comprising a computer readable program for controlling power supply of a plurality of load devices, wherein the computer readable program when executed on a computer causes the computer to perform the steps of claim 11.

18. The method according to claim 11, wherein the fraction is based on at least one of a first value that is larger than or equal to a sum of maximum power consumptions of the plurality of load devices or a second value that is based on said power change information and resulting total power consumption of at least two most recent steps of said stepwise procedure.

19. The method according to claim 18, further comprising:
   performing said power change commands at said plurality of load devices according to said stepwise procedure by changing power consumption of the load devices in accordance with said generated power change commands.

20. The method according to claim 11, further comprising:
   performing said generated power change commands at said plurality of load devices according to said stepwise procedure by changing power consumption of the load devices in accordance with said generated power change commands.

\* \* \* \* \*